(12) United States Patent
Van Dyke

(10) Patent No.: US 8,066,464 B1
(45) Date of Patent: Nov. 29, 2011

(54) DECK FASTENER

(76) Inventor: Mark S. Van Dyke, San Luis Obispo, CA (US)

( * ) Notice: Subject to any disclaimer, the term of this patent is extended or adjusted under 35 U.S.C. 154(b) by 480 days.

(21) Appl. No.: 12/287,401

(22) Filed: Oct. 9, 2008

(51) Int. Cl.
*F16B 15/00* (2006.01)
(52) U.S. Cl. ........................................ 411/458; 52/489.2
(58) Field of Classification Search .................. 411/458, 411/459, 451.1, 451.3, 456, 141, 387.3, 387.5, 411/126, 144, 166, 172, 176; 403/248; 52/714, 52/715, 363, 489.1, 489.2
See application file for complete search history.

(56) References Cited

U.S. PATENT DOCUMENTS

| | | | | |
|---|---|---|---|---|
| 29,189 | A | * | 7/1860 | Butler .............................. 416/65 |
| 554,908 | A | * | 2/1896 | Brunes .......................... 411/458 |
| 1,091,674 | A | * | 3/1914 | Lee ................................ 411/176 |
| 1,918,936 | A | * | 7/1933 | Shearman ...................... 411/456 |
| 3,010,353 | A | * | 11/1961 | Psaros ........................... 411/456 |
| 5,251,996 | A | * | 10/1993 | Hiller et al. ................... 403/331 |
| 5,529,428 | A | * | 6/1996 | Bischof ........................ 403/408.1 |
| 5,840,078 | A | * | 11/1998 | Yerys ............................ 606/151 |
| 5,997,209 | A | | 12/1999 | Sachs |
| 6,810,633 | B2 | | 11/2004 | Harris, Sr. |
| 7,025,551 | B2 | * | 4/2006 | Haytayan ..................... 411/442 |
| 7,052,200 | B2 | | 5/2006 | Harris |
| 7,356,972 | B2 | | 4/2008 | Leek et al. |
| 7,398,623 | B2 | | 7/2008 | Martel et al. |
| 7,409,803 | B2 | | 8/2008 | Grohman |

* cited by examiner

*Primary Examiner* — Gary Estremsky
(74) *Attorney, Agent, or Firm* — Stan Collier

(57) ABSTRACT

The present invention is a hidden fastener for securing deck boards to supporting joists. The fastener consists of a head shaft; one or more blades attached to the head shaft oppositely, if there are two blades, at the top outer surface of the head shaft and being formed to penetrate into deck boards, whether wood or composite, when rotated therein to; a driver attachment being located in the upper portion of the head shaft and shaped to fixedly hold a driver for turning the head shaft and one or more blades; and a fastening device in a lower portion of the head shaft. The fastening device may be an integral part of the head shaft or a screw mounted in lower port of the head shaft. After the location of the fastener is defined on the joist, the fastening device is driven into the joist to hold the head shaft thereto. One or more adjacent boards are butted against the head shaft. A driver is then inserted into or on to the driver attachment and the head shaft is rotated a sufficient amount to cause the one or more blades to be imbedded within the boards. The deck boards also may be removed as desired by reversing this procedure thus allowing for the replacement of damaged boards or for gaining access to the space under the deck without the tedious task of removing and replacing conventional deck screws, for example.

6 Claims, 7 Drawing Sheets

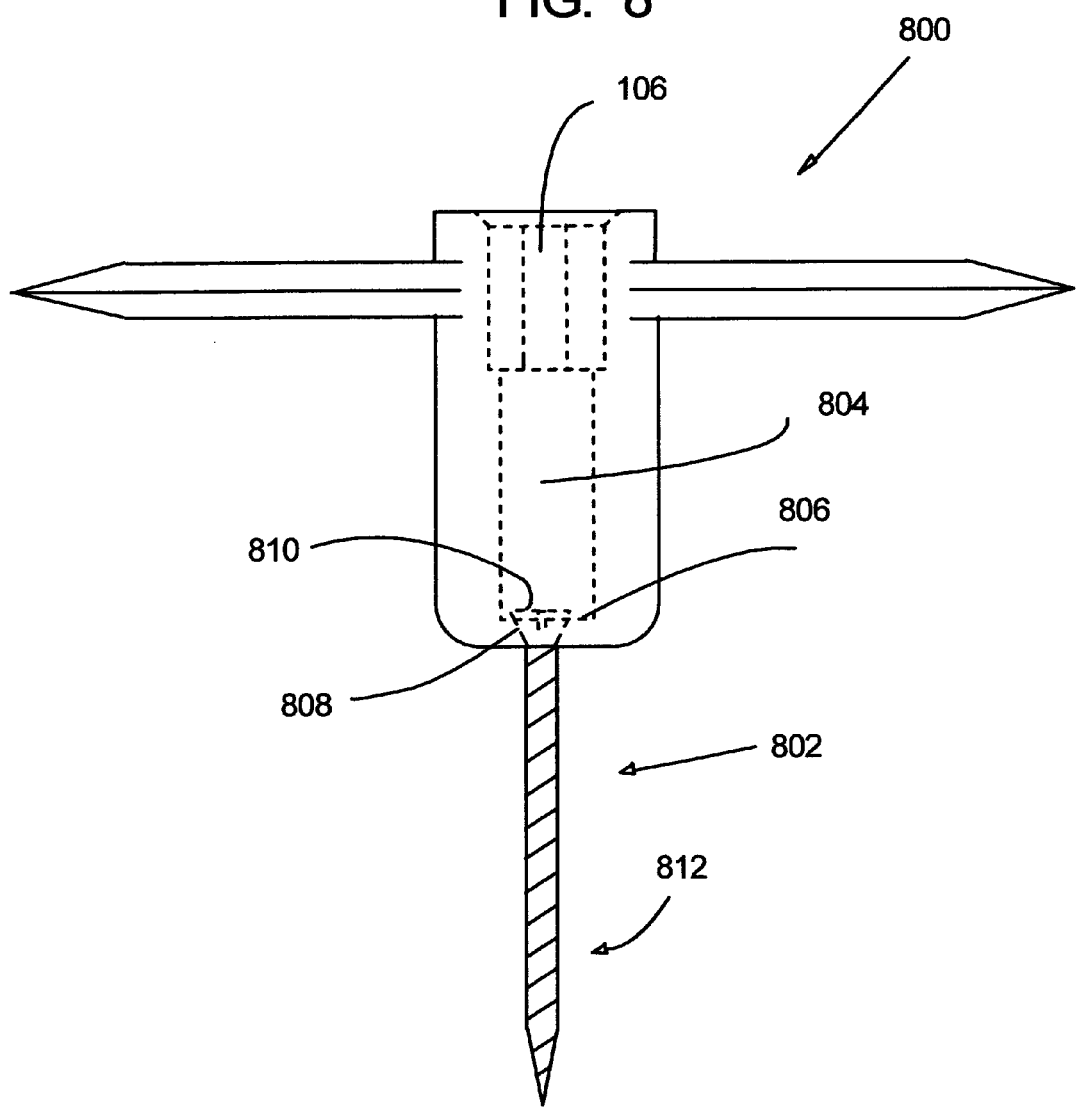

1010    1020    1030    1040

1110    1120    1130    1140

DECK FASTENER

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable.

BACKGROUND OF THE INVENTION

1. Field of the Invention

The present invention relates generally to fasteners, and, particularly, relates to fasteners used in building construction, and, in greater particularity, relates to fasteners for deck construction.

2. Description of the Prior Art

Decks on houses have become a common necessity for modern day living and provide a relatively open area where parties may be enjoyed without fear of damage to expensive indoor furniture and carpeting and the use of a barbecue grill is appropriate. They provide a desirable location for many outdoor activities and may complement a patio at ground level that may surround a pool. A screened and/or covered deck may also be desirable where insects are common at night, and a shade is needed to reduce the sun's glare and heat during the day.

Decks are relatively simple to construct. Posts, normally 4×4s, are placed on concrete footings. Girders, such as nailed together 2×6s or 2×8s, are mounted to the tops of the posts. Perpendicular to the girders are mounted floor joists. The decking is attached to the floor joists with fasteners such as nails, deck screws, and specially made brackets. The boards themselves are typically made of composite materials or treated lumber to prolong their life in the outside elements. For example, the use of deck screws is common. The deck screws may be made of a special metal, galvanized, painted or specially coated to prevent corrosion. In order to prevent board splitting and ease of drilling, pre-drilling of each hole with a drill-countersink combination is normally required. This is a long and tedious process especially if the deck is large. If the need comes to replace broken boards, the screws must be removed. This may be difficult because of weathering, breaking, paint and/or dirt in the head slots, etc.

Several prior art devices attempt to provide fasteners to address some of these issues. U.S. Pat. No. 7,409,803 entitled, "Hidden Deck Fastener System," discloses a deck system that employs a "plurality of substantially hidden fasteners to couple the floor boards of the deck to the joists. Each hidden fastener is rigidly coupled to a respective joist and positioned between a pair of adjacent floorboards. Each fastener forms a mating relationship with specially configured sides of the boards to thereby rigidly couple the boards to the joists. As seen therein, the fastener requires special manufacturing techniques to be made and thus increases the cost of that system. Further, the boards must have specially cut edges to mate to the fasteners. Once the fastener is attached by staples, screws or nails, it is difficult to remove since it is essentially "hidden," and if removed would or might require new staples, screws or nails. Also, the cutting of the special mating edge in the wood board provides addition water entry or sources for fungal growth, etc.

Another U.S. Pat. No. 7,398,623, entitled "Deck Board Fastener with Concave Prongs," discloses a bracket for use in securing deck boards. The bracket has two pairs of oppositely opposing prongs. These prongs are integral to a vertical member and have a spacer member on one side. A bottom flange is secured to the joists with nails or screws. Adjacent boards are driven into the prongs for securement. It is essentially impossible to remove the bracket after it is installed, and thus the removal of boards becomes a major project.

Another U.S. Pat. No. 7,356,972, entitled, "Deck Board Tie Connector, Connection and Method," discloses a system for securing deck boards to joists. Each connector, for example, is a flat piece of metal with one or more vertical slots. The lower legs are pointed to enter into wood when hammered. A nail is driven into the vertical face of the deck board over the joist; the connector is driven over the nail into the joist. It thus appears that two connectors are required over each joist, and the nails must be driven before the boards are positioned together. Once together, removal of the connector appears impossible, unless someone is under the deck hitting upwards or the deck boards are destroyed with a pry bar. Further, the flat connectors are being driven across the joist wood grain and thus may bend easily and not enter properly thereto.

A further U.S. Pat. No. 7,052,200, entitled, "Resilient Deck Board Fastener," discloses a fastener that has two oppositely opposed upper flanges mounted to a vertical member. A pair of resilient fingers are located at each end of the fastener. This fastener requires that each board have slots cut therein for the flanges. An additional task to an already tedious job. A deck screw is inserted through the top of the vertical member to hold it to the joist. This fastener further prevents removal of the deck boards once installed unless each fastener along one side is removed firstly. U.S. Pat. No. 5,997,209, entitled, "Decking Clip," discloses a metal bracket for securing deck boards to joists. A pair of opposing prongs are located on the top edge. A supporting member of the prongs provides a means for separating the deck boards a given distance. The side of the bracket is nailed to the side of the joist. The deck boards are hammered onto the prongs for securing. This procedure is repeated for each new board. Removal of the deck boards appears to be almost impossible without damage to/or bending of the bracket and the boards.

Accordingly, there is an established need for a fastener having a means for securing of the deck boards that provides ease of manufacture, ease of attachment, and ease of removal of the deck boards as needed as well as other features noted below.

SUMMARY OF THE INVENTION

The present invention is directed at fasteners for securing deck boards, in particular.

The present invention is a fastener for securing deck boards to supporting joists. The fastener of the present invention comprises a head shaft; one or two blades attached to the head shaft oppositely, if there are two, at the top outer surface of the head shaft and being formed to penetrate into deck boards when rotated therein to; a driver attachment being located in the upper portion of the head shaft and shaped to fixedly hold a driver for turning the head shaft and blades; and, a fastening body in a lower portion of the head shaft. The fastening body may be an integral part of the head shaft or a deck screw mounted in lower port of the head shaft. After the location of the fastener is defined on the joist, the fastening body is driven into the joist to hold the head shaft thereto. One or more adjacent boards are butted against the head shaft. A driver is then inserted into or on to the driver attachment and the head shaft is rotated a sufficient amount to cause the two blades, for example, to be imbedded within the boards. The deck boards also may be removed as desired by reversing this procedure thus allowing for the replacement of damaged boards or for gaining access to the space under the deck without the tedious task of removing and replacing conventional deck screws, for example.

An object of the present invention is to provide a means for securing deck boards made of either wood or composite materials.

It is another object of the present invention to provide a deck fastener that is easily manufactured and without moving parts therein.

It is a further object of the present invention to provide a deck fastener that is hidden.

It is another object of the present invention to provide a deck fastener that does not require any pre-drilling of screw holes.

It is still a further object of the present invention to provide a deck fastener that attaches to deck boards by means of one or more blades that are rotated into engagement with the deck boards.

It is yet a further object of the present invention to provide a deck fastener that may be rotated out of engagement with the deck boards so that the deck boards may be easily removed for repair, replacement, or for gaining access to the space under the deck.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 8 is a side view of a fastener of the present invention having a deck screw as the fastening body;

Like reference numerals refer to like parts throughout the several views of the drawings.

DETAILED DESCRIPTION OF THE PREFERRED EMBODIMENTS

The present invention is directed at a deck fastener that allows for the removal and replacement of the deck boards without damage to the deck boards or fasteners.

In general, the present invention is a fastener for securing deck boards to supporting joists. The fastener consists of a head shaft; one or more of blades attached to the head shaft oppositely, if two blades, at the top outer surface of the head shaft and being formed to penetrate into deck board(s) when rotated therein to; a driver attachment being located in the upper portion of the head shaft and shaped to fixedly hold a driver for turning the head shaft and blades; and a fastening device located in a lower portion of the head shaft. The fastening device may be an integral part of the head shaft or a deck-like screw mounted in lower port of the head shaft. After the location of the fastener is defined on the joist, the fastening device is driven into the joist to hold the head shaft thereto. One or more adjacent boards are butted against the head shaft that provides a predetermined separation distance between the boards. A driver is then inserted into or on to the driver attachment and the head shaft is rotated a sufficient amount to cause the two blades to be imbedded within the boards. The deck boards also may be removed as desired by reversing this procedure thus allowing for the replacement of damaged boards or for gaining access to the space under the deck without the tedious task of removing and replacing conventional deck screws, for example.

Figure 1:
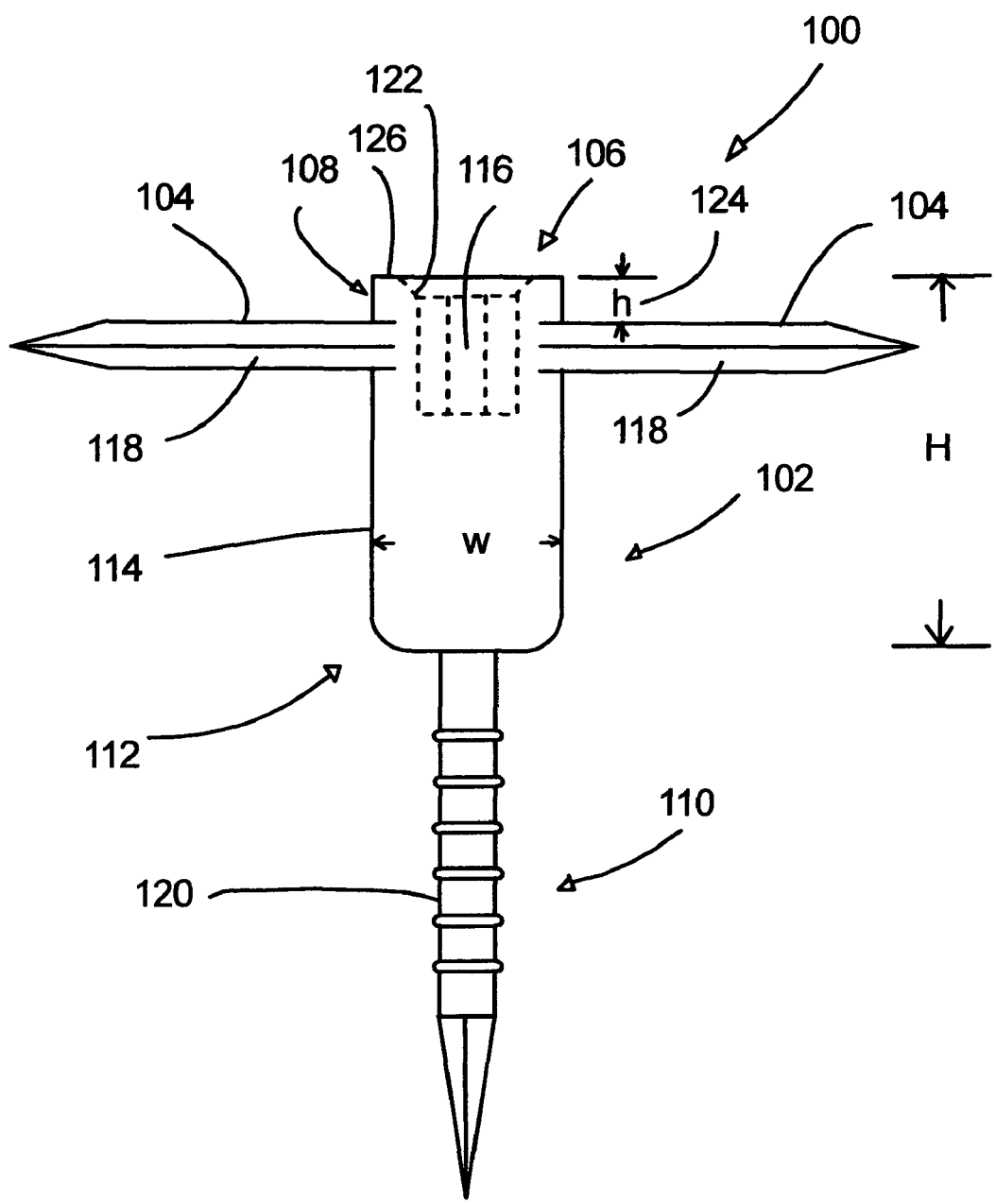
FIG. 1 is a side view of a fastener of the present invention.

Turning to the drawings, wherein like components are designated by like reference numerals throughout the various figures, attention is initially directed to FIG. 1 that illustrates a side view of a deck fastener 100 constructed according to the present invention.

Figure 7A:
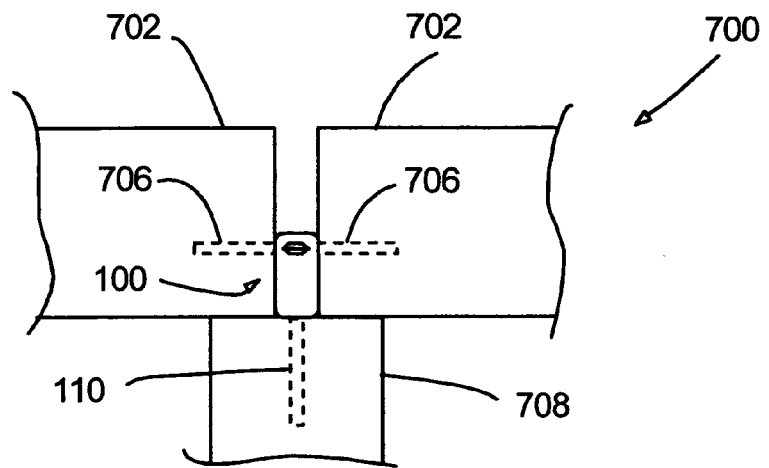
FIG. 7A is a side view of the fastener of the present invention, driven into a girder and positioned between two deck boards before the blades are imbedded in the deck boards.

As best shown in FIG. 1, the deck fastener 100 for removably securing deck boards 702, FIG. 7A, comprises a head shaft 102 with one or more blades 104 fixedly attached to the head shaft 102. A driver attachment 106 is fixedly attached to a top portion 108 of the head shaft 100. A fastening device 110 is located in a bottom portion 112 of the head shaft 100.

Figure 6:
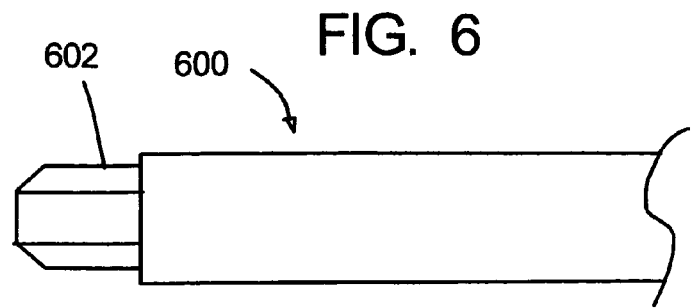
FIG. 6 is a side view of a driver of the present invention.

The head shaft 102 is a cylindrical body 114 made of metal such as steel or stainless steel, etc. The height H of body 114 is preferrably approximately one half to three quarters the thickness of a conventional deck board and the width W is predetermined to be the distance between the deck boards, approximately ¼ inch. In the top portion 108, the driver attachment 106, in the preferred embodiment, is a shaped void 116 made for receiving a driver 600 such as an Allen wrench end 602, FIG. 6. Other shaped voids are possible such as a slot, an "x," a box, a pentagon, a hexagon, etc. The driver 600 is used to rotate the fastener 100 once the fastener 100 is driven into a joist 706, FIG. 7. Due to flaring of the driver tip, a beveled edge 122 is located about the shaped void 116 as seen in FIG. 1. The driver attachment 106 may also be shaped like a bolt head and thus a socket may be used to position, drive, and turn the head shaft 102.

Figure 10:
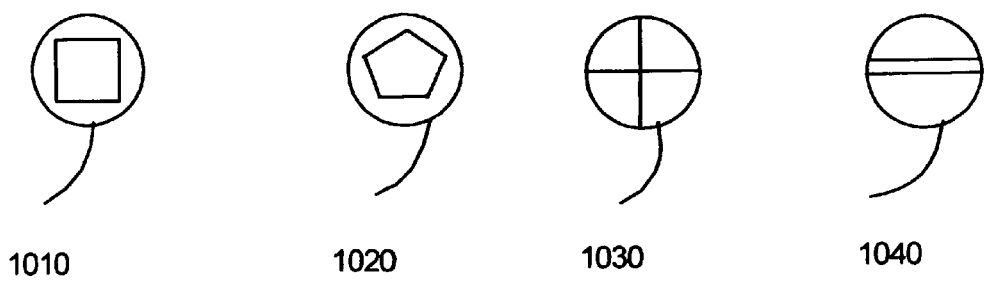
FIG. 10 shows several end views of different driver bit shapes.
Figure 11:
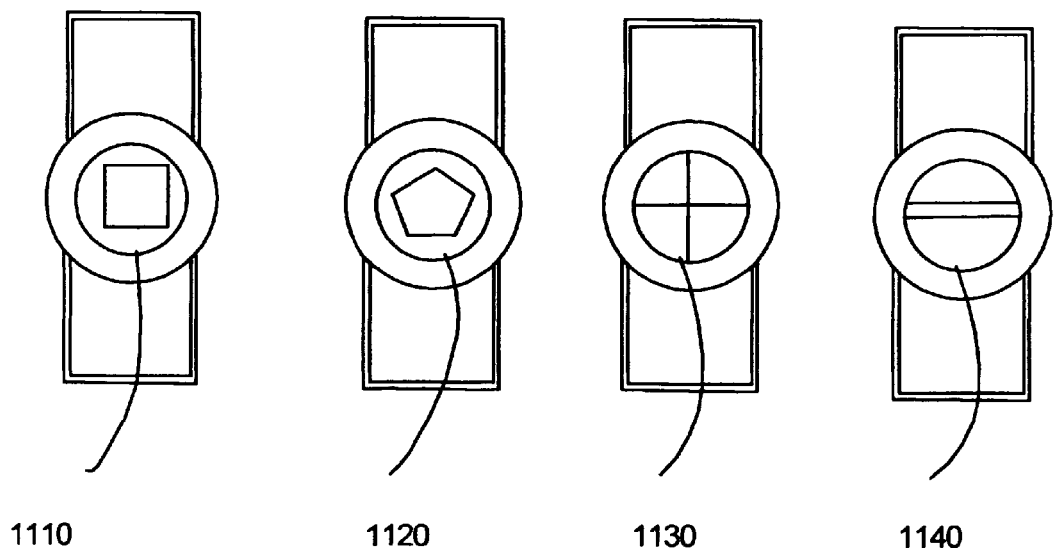
FIG. 11 shows complementary shaped voids within a head shaft of the present invention for accepting the driver bit shapes as shown in FIG. 10.

As noted in the above paragraph, the driver bit may have other shapes to fit within shaped voids noted above in the driver attachment 106. FIG. 10 shows a box bit 1010, a pentagon shaped bit 1020, a Philips head bit 1030 and a slot bit 1040. The corresponding voids within the head shaft are shown in FIG. 11 such as a box 1110, a pentagon 1120, a Philips 1130 and a slot 1140. The other figures show voids in the head shaft for an Allen bit.

The deck fastener 100 as seen in FIG. 1 has two opposed blades 104 formed as an integral part of the head shaft 102 on the top portion 108. The blades 104 should be located at approximately the center of the deck boards when attached. The blades are offset a distance h 124 from a top surface 126. When the fastener 100 is rotated, each of these blades 104 would be imbedded into adjacent deck boards as shown in FIG. 7B.

Figure 2:
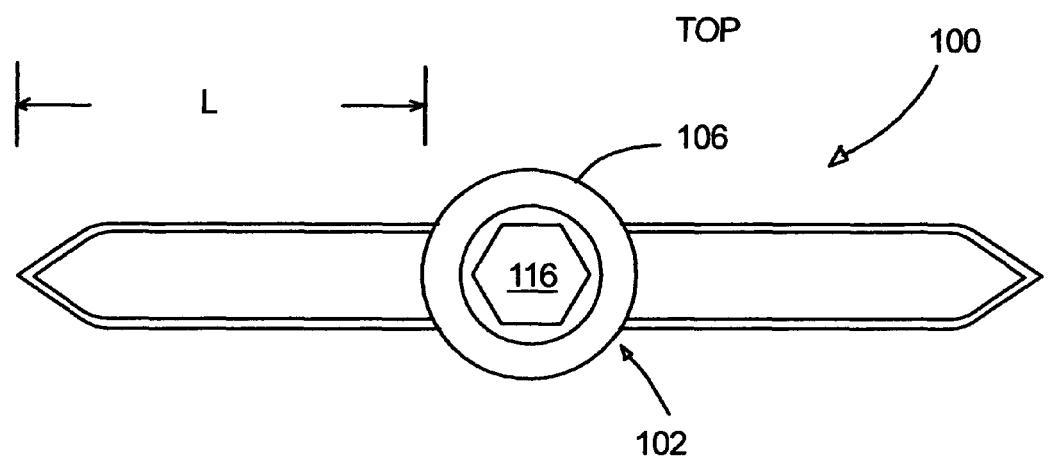
FIG. 2 is a top view of the fastener of FIG. 1 of the present invention.
Figure 3:
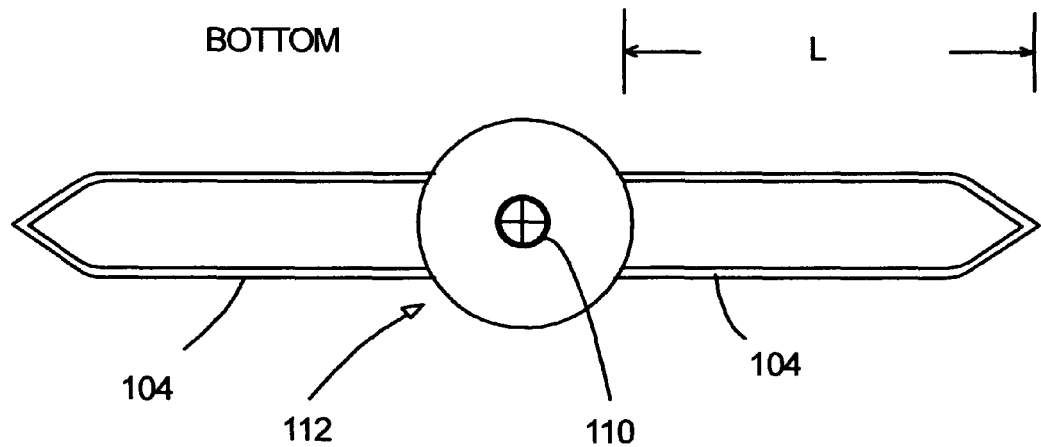
FIG. 3 is a bottom view of the fastener of FIG. 1 of the present invention.
Figure 4:
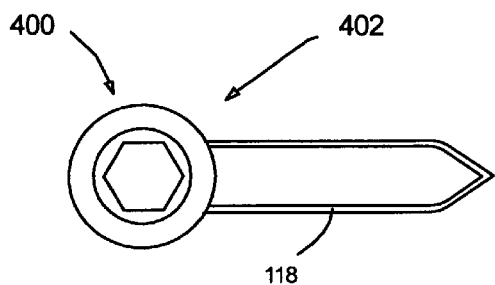
FIG. 4 is a top view of a fastener having only one blade of the present invention.
Figure 7B:
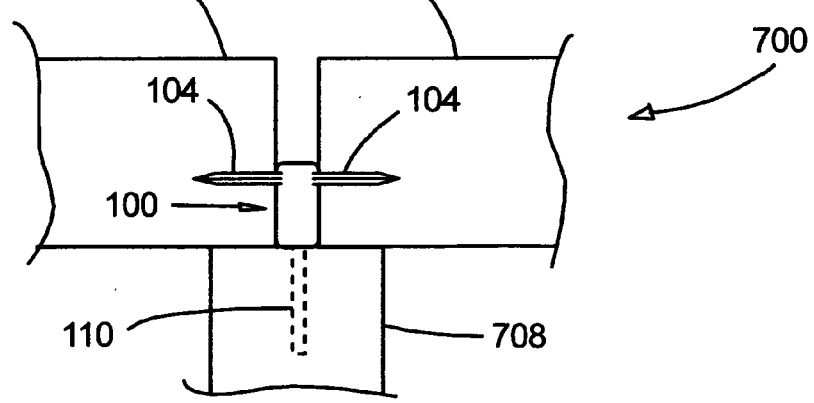
FIG. 7B is a side view of the fastener of the present invention after the blades are imbedded in the deck boards.

On the house side of the deck 700, partially shown in FIGS. 7A and 7B, only one blade 402 is required on a fastener 400 as shown in FIG. 4. The blades 104 and 402 have predetermined areas of blade edges 118 that are sharpened to imbed into the deck material. These edges 118 may be formed directly by grinding or during the forming of the fastener 100 itself. The blades can be any shape and size, and have any blade edge whether sharpened or not depending on the deck material. The deck fastener 100 may be used for securing deck material, in particular wood or composite materials. Because of the different density and hardness, different blade lengths L, FIG. 2 and FIG. 3, may be required. In woods, a length L may be ½ inch and there may be no sharpened edges. In composites, the length L may be ¼ inch, for example.

Figure 5A:
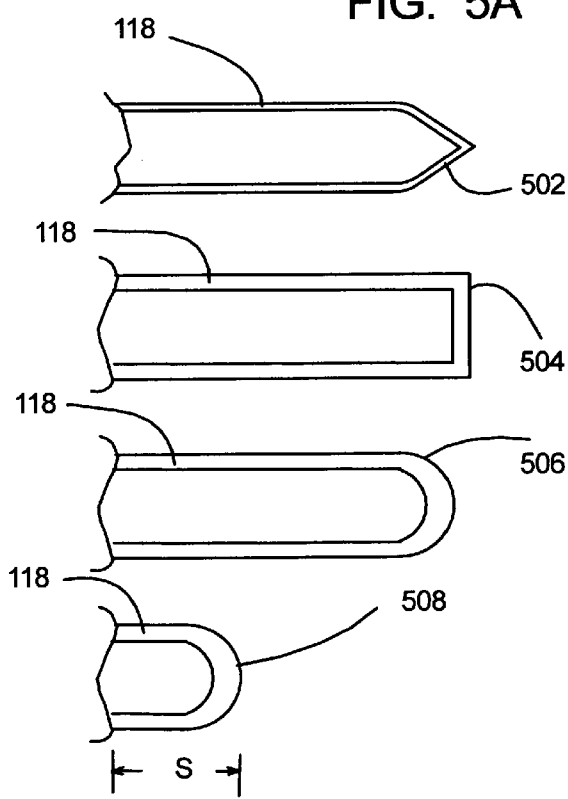
FIG. 5A is a top view of various rectangular blade shapes of a fastener of the present invention.
Figure 5B:
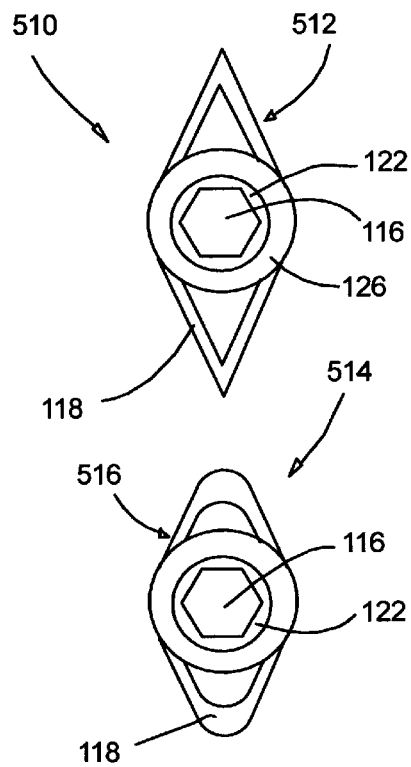
FIG. 5B is a top view of various triangular blade shapes of a fastener of the present invention.

Different blade shapes and lengths are shown in FIGS. 5A and 5B. The blades having a generally rectangular shape are shown in FIG. 5A, and triangular shapes are shown in FIG. 5B. The blades may have different shaped tips where there is a triangular tip 502, a square tip 504, and a rounded tip 506 and 508. A short blade 508 is shown having a length "s." FIG. 5B shows two fasteners 510 and 514 by top view having two triangular shaped blades 512 and 516, respectively. The shapes and lengths of the blades are predetermined by the deck materials used. Irrespective of the deck materials, a horizontal slot 706, in outline, FIG. 7A, having a thickness of approximately one half of the blade may be formed at the locations where the fasteners are to be attached to a joist 708, only one shown, in FIG. 7A. A router, table saw, or similar device may be used to selectively slot the deck boards at these locations at the job site.

The deck fastener 100 has, in one embodiment, the fastening device 110, FIG. 1 and FIG. 3, fixedly attached to the bottom portion 112 of the head shaft 102. This may be a ring-shank nail 120 as shown, for example. The fastening device 110 may have other surface features to insure additional holding power in the joists such as being coated, knurled, etc. The fastening device 110 is integrally formed during manufacture.

FIG. 8 illustrates a fastener 800 wherein a fastening device 802 such as a deck screw is inserted into and through the attachment device 106 and a screw channel 804. The screw channel 804 may be of a smaller diameter than the shaped void 108 of the attachment device 106 to prevent the entering therein of the driver bit, but the attachment device 106 may also include the screw channel 804. The driver 600 with an Allen tip 602 was shown in FIG. 6. At the bottom 806 is located a screw port 808 for holding a screw head 810 therein. A screwdriver must have a sufficiently narrow blade in order to enter into the fastener 800 to drive the screw 812 into the joist. This contrasts to the fastening device 100 shown in FIG. 1 where the fastening device 110 is integrally formed with the head shaft 102, and the driver 600 or a similar device is used to drive the nail 120 into the joist by use of a hammer, for example.

Figure 9A:
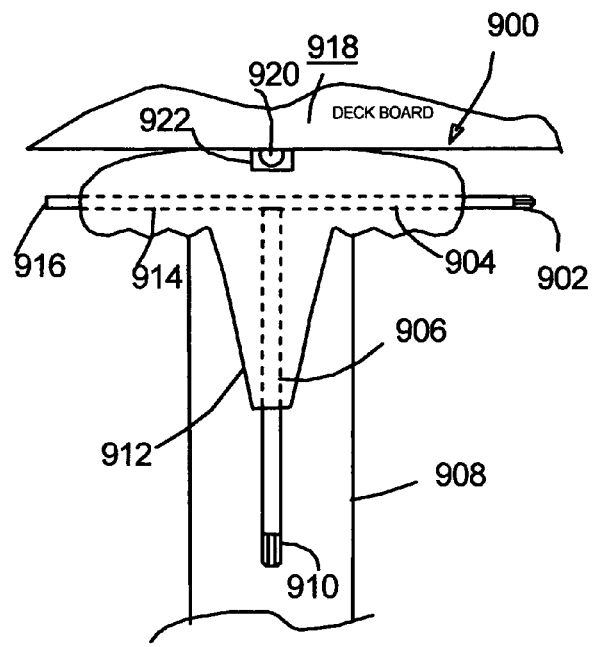
FIG. 9A is a top view of a multi-functional deck fastener tool for use with the deck fastener of the present invention.
Figure 9B:
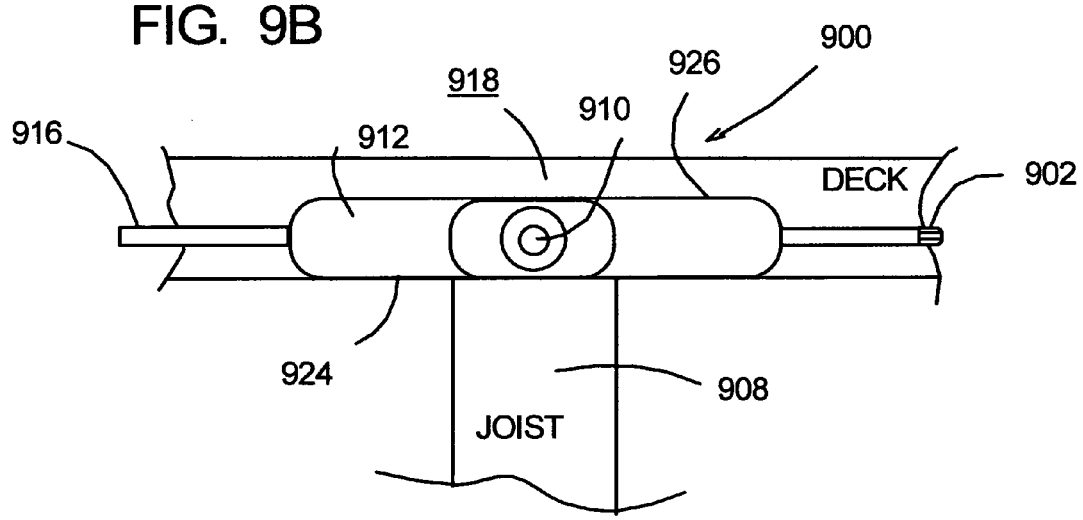
FIG. 9B is a front view of a multi-functional deck fastener tool for use with the deck fastener of the present invention showing the flat sides thereon.

FIG. 9A shows a multi-functional deck fastener tool 900 of the present invention. Initially the nail 120 of the deck fastener 100, FIG. 1, is placed in a magnetized nail set 920 of the tool 900. The nail set 920 in sleeve 922 is molded into a plastic handle 912 as shown. The tool 900 is positioned on top of a joist 908 and against the deck board 918 with the fastener 100 therein, not shown, against the deck board 918. A hammer or other impact tool, not shown, but considered conventional is used to set the fastener 100 by hitting the top surface 126, FIG. 1. At that point, the tool 900 is removed and a driver end 902, which may be shaped like an Allen bit, being beveled also, is inserted into the shaped void 116, FIG. 1. The hammer then is used to hit an impact end 916 to drive the nail 120 into the joist 908. After the adjacent deck board is positioned against the deck fastener 100, a driver bit 910 is inserted into the driver attachment 106. In this example, the driver bit 910 is shaped like an Allen bit such as shown also in FIG. 6. With the bit in placed, the handle of tool 900 is turned until the one or more blades of the deck fastener 100, 400, 510, or 514 are imbedded in the deck board. FIG. 9B illustrates by front view the tool 900 of FIG. 9A showing the one or more flat sides 924 and 926 so that the tool 900 may be securing positioned on the deck joist 908.

After the deck joists, the railing posts and steps are installed, the first deck board is located adjacent to the house. The house side of that deck board may be secured with conventional deck screws to the joists and header joist or the appropriate deck fastener 400 may be used along the header joist. On the outer side of the first deck board, the appropriate fasteners 100 or 400 or 800 or similar, may be located on each joist or alternate joists as necessary using the tool 900 noted above. If the one blade version of the deck fastener is used between the deck boards, two deck fastener may be used per joist location. The fastener is positioned to have the one or more blades parallel to the deck board edges. The shaft head is placed in contact with the side of the deck board and then driven into the joist. The next deck board is then placed adjacent to and in contact with the installed fasteners. This determines the separation between the deck boards. These steps are repeated until the last deck board is positioned along an outer header joist. The outer edge of this last deck board is then secured to the header joist with conventional deck screws or one blade fasteners.

After the deck has been installed, one or more of the deck boards may be removed or replaced by counter rotating each appropriate deck fastener to disengage the one or more blades from the deck boards so that the deck boards may be removed from the deck leaving said fasteners in place for future use. This allows for easy replacement of damaged boards, or access to the space under the deck.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A deck fastener for removably securing deck boards comprising:
   a head shaft, wherein said head shaft is a cylindrical body having a top portion and a bottom portion thereon, and having a diameter adapted to be equivalent to a given desired separation between the deck boards;

one or more blades integrally formed to the head shaft;

a driver attachment, said driver attachment being integrally formed in a top portion of said head shaft, wherein said driver attachment is of a predetermined void shape within the top portion of said head shaft, said shaped void accepting therein a driver bit; and a fastening device integrally formed to a bottom portion of said head shaft.

2. A method for using a deck fastener as recited in claim 1 for removably securing deck boards, said method comprises the steps of:

positioning a deck board upon a support frame;

securing the deck board to the support frame;

positioning at least one deck fastener to the support frame, the shaft head being in substantial contact with a side of the deck board, one or more blades being substantially parallel to the side;

driving at least one or more fastening devices into the support frame;

securing ends of the next deck board to the support frame, the shaft head being in substantial contact with the next deck board; and rotating the one or more deck fasteners with one or more blades thereon to embed into one or more deck boards.

3. The method of using a deck fastener as recited in claim 2, further including a steps of selecting the deck material from a group consisting of a wood and a composite material, and further selecting a deck fastener appropriate to the deck material.

4. The method of using a deck fastener as recited in claim 2, further including a step of providing said head shaft having two blades thereon, said blades attached to an outer surface of the shaft head, said blades being opposite to one another, and located a predetermined distance from a top surface of the shaft head.

5. The method of using a deck fastener as recited in claim 2, further including the step of counter rotating the deck fastener to disengage the one or more blades from one or more deck boards therein the one or more deck boards may be removed from the deck leaving the deck fastener for future use.

6. A deck fastener for removably securing deck boards comprising:

a head shaft, wherein said head shaft is a cylindrical body having a top portion and a bottom portion thereon, and having a diameter adapted to be equivalent to a given desired separation between the deck boards;

one or more blades integrally formed to the head shaft;

a driver attachment, said driver attachment being integrally formed in a top portion of said head shaft, wherein said driver attachment is of a predetermined void shape within the top portion of said head shaft, said shaped void accepting therein a driver bit, wherein said driver bit has a head shape selected from the group consisting of a square, a pentagon, a hexagon, a Philips shape, and a slot head, for engaging the complementary shaped void within said head shaft; and a fastening device integrally formed to a bottom portion of said head shaft.

\* \* \* \* \*